United States Patent
Dehnert et al.

(10) Patent No.: US 7,188,654 B2
(45) Date of Patent: Mar. 13, 2007

(54) PLY WITH STRENGTH CARRIERS EMBEDDED IN A RUBBER MIXTURE AND VEHICLE PNEUMATIC TIRES WITH A BELT BANDAGE THEREOF

(75) Inventors: Joerg Dehnert, Neustadt/Rbge (DE); Guenter Wahl, Hohenhameln (DE)

(73) Assignee: Continental Aktiengesellschaft, Hannover (DE)

( * ) Notice: Subject to any disclaimer, the term of this patent is extended or adjusted under 35 U.S.C. 154(b) by 169 days.

(21) Appl. No.: 10/840,331

(22) Filed: May 7, 2004

(65) Prior Publication Data

US 2004/0221937 A1 Nov. 11, 2004

(30) Foreign Application Priority Data

May 9, 2003 (EP) ................... 03010462

(51) Int. Cl.
*B60C 9/00* (2006.01)
*B60C 9/18* (2006.01)
*D02G 3/48* (2006.01)

(52) U.S. Cl. ................ 152/526; 152/451; 152/527
(58) Field of Classification Search ........... 152/451, 152/526, 527
See application file for complete search history.

(56) References Cited

U.S. PATENT DOCUMENTS

| | | | |
|---|---|---|---|
| 5,151,142 A * | 9/1992 | Imai et al. | 152/565 |
| 5,408,007 A * | 4/1995 | Mizuno et al. | 525/305 |
| 5,558,144 A | 9/1996 | Nakayasa et al. | |

2002/0079037 A1  6/2002  Yukawa et al.

FOREIGN PATENT DOCUMENTS

| | | |
|---|---|---|
| EP | 0335588 | 10/1989 |
| EP | 0467585 | 1/1992 |
| EP | 0661179 | 7/1995 |
| EP | 1207055 | 5/2002 |

OTHER PUBLICATIONS

Patent Abstracts of Japan 04356205 dated Dec. 9, 1992.
ASTM D 885, Apr. 2003, 1 page.

* cited by examiner

*Primary Examiner*—Justin R. Fischer
(74) *Attorney, Agent, or Firm*—Greenblum & Bernstein, P.L.C.

(57) ABSTRACT

Belt bandage for a vehicle pneumatic tire that includes a ply having strength carriers embedded in an unvulcanized rubber mixture. The strength carriers run essentially parallel to one another. Each strength carrier includes a hybrid cord that has a first twisted yarn having a high modulus of elasticity of at least approximately 25000 N/mm² and a second twisted yarn having a low modulus of elasticity which is no greater than approximately 15000 N/mm². The first and second twisted yarns are final-twisted together. A cord count E in cords per 5 cm ply widths, a force $F_1$ at 2% elongation of each hybrid cord, and a force $F_2$ at 6% elongation of each hybrid cord satisfies the following relationships:

$F_1 \times E \geq$ approximately 600 N $F_2 \times E >$ approximately 1500 N.

This Abstract is not intended to define the invention disclosed in the specification, nor intended to limit the scope of the invention in any way.

34 Claims, No Drawings

PLY WITH STRENGTH CARRIERS EMBEDDED IN A RUBBER MIXTURE AND VEHICLE PNEUMATIC TIRES WITH A BELT BANDAGE THEREOF

CROSS-REFERENCE TO RELATED APPLICATIONS

The present application claims priority under 35 U.S.C. §119 of European Patent Application No. 03010462.4, filed on May 9, 2003, the disclosure of which is expressly incorporated by reference herein in its entirety.

BACKGROUND OF THE INVENTION

1. Field of the Invention

The invention relates to a ply with strength carriers embedded in an unvulcanized rubber mixture for the belt bandage of vehicle pneumatic tires, whereby the strength carriers in the ply run essentially parallel to one another and are hybrid cords that are made of a first twisted yarn with a high modulus of elasticity and a second twisted yarn with a low modulus of elasticity which are final-twisted together. Furthermore, the invention relates to a vehicle pneumatic tire containing a belt bandage of such a ply.

2. Discussion of Background Information

With vehicle pneumatic tires, in particular in high-speed use, in order to prevent a lifting of the tire through the centrifugal forces that occur when driving, it is known to provide a belt bandage with a vehicle pneumatic tire that in general features an air-impermeable inner layer, a radial carcass containing strength carriers and extending from the zenith area of the tire over the side walls into the bead area and being anchored there by wrapping high-tensile-strength bead cores, a rubber tread rubber located radially outside and featuring profile grooves, and a belt between the rubber tread rubber and the carcass. The belt bandage can be embodied in one ply or multiple plies, covers at least the belt edges and contains parallel strength carriers running essentially in the circumferential direction in the form of cords that are embedded in rubber.

In tire manufacturing, the bandage is applied in the form of plies with strength carriers embedded in an unvulcanized rubber mixture, which plies are wound or reeled onto the belt. The strength carriers for such plies are embedded in rubber, in that a number of thread-shaped strength carriers (that are essentially parallel and as a rule are thermally pre-treated and/or pretreated with an impregnation in the manner known to one skilled in the art for better adhesion to the embedding rubber) run through a calender or an extruder in the longitudinal direction to be covered with a rubber mixture. In the shaping and vulcanization of the tire, the tire lifts/expands as a rule in the shoulder area by approx. 1 to 2% and in the center area by approx. 3 to 4% compared to the unvulcanized green tire, when the green tire is wound on a flat drum.

In EP-B 0 335 588 and EP-B 0 661 179 hybrid cords are suggested for the strength carrier cords of the belt bandage. These hybrid cords are twisted together from yarns with a high modulus of elasticity and with a lower modulus of elasticity. In a tensile stress/strain diagram with slight elongation, the cords first exhibit a slight rise of the curve; with higher elongation, the curve then rises markedly. In this last area, a slight further elongation, e.g., of 6 to 7%, is associated with high energy consumption. In tire manufacturing, the cords should permit a sufficient lifting in the shaping and in the vulcanization mold so that the tire can be formed precisely, and after completion of the tire, they ensure good high-speed serviceability under driving conditions.

EP-B 0 661 179 describes plies with strength carriers embedded in an unvulcanized rubber mixture for the belt bandage of vehicle pneumatic tires. The strength carriers run essentially parallel to one another in the ply and are hybrid cords that are made of a first twisted yarn with a high modulus of elasticity of at least 30000 N/mm$^2$ and a second twisted yarn with a low modulus of elasticity of no more than 20000 N/mm$^2$. These are final-twisted together. In the ply for the belt bandage, the cord count E in cords per 5 cm ply width, the force $F_1$ with a 2% elongation of the hybrid cord (elongation range that is relevant for the lifting in the manufacture of the tire) and the force $F_2$ with a 6% elongation of the hybrid cord (elongation range that is relevant for high-speed driving) satisfy the following relationships: $F_1 \times E < 60$ kgf ($\approx 588.4$ N), $F_2 \times E > 150$ kgf ($\approx 1471$ N). In addition to ease of fabrication and durability, the tires with such a ply as a bandage have a reduced weight. However, it has been proven that tires with such a belt bandage still have disadvantages in abrasion behavior.

SUMMARY OF THE INVENTION

The present invention is directed to plies of strength carriers embedded in rubber for the belt bandage of tires, which plies ensure a very good high-speed durability of the tire and, in addition, bring about an improved abrasion behavior of the tire, i.e., a reduced abrasion in particular in the speed range of up to approximately 200 km/h, and an increased long-term durability. The running performance of a tire with a belt bandage on such a ply is thus extended.

The hybrid cords are made of a first twisted yarn with a high modulus of elasticity of at least approximately 25000 N/mm$^2$ and a second twisted yarn with a low modulus of elasticity of no more than approximately 15000 N/mm$^2$, which are final-twisted together. The hybrid cords are structured symmetrically, i.e., the initial twist counts of the first and second yarns are essentially identical with a maximum deviation of approximately 7%, one yarn is twisted in the Z direction and the other in the S direction and the cord is twisted together with a final twist count essentially identical to the initial twist counts. The cord count E in cords per 5 cm ply widths (cord yarn density), the force $F_1$ at 2% elongation of the hybrid cord, and the force $F_2$ at 6% elongation of the hybrid cord may satisfy the following relationships: $F_1 \times E \geq 600$ N and $F_2 \times E > 1500$ N.

The basic concept of the invention is that a ply according to the invention still renders possible an adequate lifting during the shaping and vulcanization in the manufacture of a vehicle pneumatic tire through the symmetrical cords of high-modulus and low-modulus yarn and the elongation behavior. Through the high forces that occur even with a slight elongation of 2% ($F_1 \times E \geq 600$ N), the tire acquires an increased circumferential stiffness as well as a flatter tire contour that then brings about particularly good abrasion behavior. Surprisingly, improvements (i.e., the reduction of abrasion) are achieved in uneven and local abrasion (e.g., block breakaways or saw tooth profile) as well as in abrasion that is homogenous over the circumferential direction (e.g., rib lowering). At the same time, the increased circumferential stiffness brings about an improved high-speed durability. Also at the same time, structuring the hybrid cords in a symmetrical manner leads to an improved long-term durability of the tire, since symmetrical cords feature a much improved fatigue resistance.

Furthermore, tires with the plies and a belt bandage according to the invention have the advantage of greatly reduced flat spots under load (flatspotting) and the tire weight can be greatly reduced compared to tires with conventional nylon bandages without reductions in other tire properties having to be tolerated. This occurs because fewer or thinner strength carrier cords are required. The hybrid cord combines the advantages of a yarn with a high modulus and a yarn with a low modulus.

For a particularly good abrasion behavior of tires (as well as an ease of production), it has proven advantageous for the cord count E in cords per 5 cm ply width and the force $F_1$ at 2% elongation of the hybrid cord to satisfy the following relationship: 1000 N<$F_1$×E<2000 N.

According to an advantageous further development of the invention, the cord count E in cords per 5 cm ply width and the force $F_2$ at 6% elongation of the hybrid cord satisfy the following relationship: 5500 N<$F_2$×E<11000 N. When such a ply is used for the belt bandage of a tire, particularly good durability is obtained in high-speed tires without any reduction in, e.g., ride comfort, having to be tolerated.

In order to further improve the abrasion behavior of tires, it has proven to be favorable for the cord count E in cords per 5 cm ply width and the force $F_3$ at 1% elongation of the hybrid cord to satisfy the following relationship: $F_3$×E>250 N.

For further improved high-speed durability, the cord count E in cords per 5 cm ply width and the force $F_4$ at 4% elongation of the hybrid cord satisfy the following relationship: $F_4$×E>3000 N.

According to an advantageous further development of the invention, the yarn with a high modulus of elasticity is an aramide yarn with a fineness of >approximately 1100 dtex, preferably approximately 1670 dtex. The aramide yarn is a yarn with a particularly high modulus of elasticity, and can be produced through a suitable twist count by twisting individual threads with a respective modulus of elasticity of between approximately 70000 N/mm$^2$ and approximately 120000 N/mm$^2$. Aramide yarns feature a particularly high tensile strength and breaking strength. They are also particularly thermally stable and have a low weight. As a rule, aramide yarns with a higher fineness are more cost-effective per kg aramide than yarns with a lower fineness.

As an aramide yarn, a yarn is preferably used which is based on co-poly-paraphenylene/3,4'-oxydiphenylene terephthalamide. Such yarns are commercially available, e.g., under the trademark Technora®. Co-poly-paraphenylene/3,4'-oxydiphenylene terephthalamide is a type of aramide in which the individual threads have a modulus of elasticity of only 74000 N/mm$^2$ before being twisted into a yarn. Individual threads of other aramide types, such as Kevlar® or Twaron® have a modulus of elasticity of 120000 N/mm . Co-poly-paraphenylene/3,4'-oxydiphenylene terephthalamide thus makes it possible to use aramide yarn with a high fineness for the hybrid cord without the modulus of elasticity of the entire hybrid cord having too high a value. Values in the modulus of elasticity of the hybrid cord that are too high have a disadvantageous effect on tire building methods that work with a lifting in the shaping and vulcanization.

A nylon yarn, e.g., nylon 6 or nylon 6.6, with a fineness of ≧approximately 940 dtex, preferably approximately 1400 dtex, is preferably used as the yarn with the low modulus of elasticity. Nylon yarn is characterized by an advantageous heat shrinking force. The higher the fineness of the nylon yarn in the hybrid cord, the higher also the nylon portion in the hybrid cord and the better the heat shrinking forces of the cord can be used for an increased circumferential stiffness and for an improved high-speed behavior.

The difference in the finenesses between the yarn with the low modulus and the yarn with the high modulus should be selected as low as possible in order to obtain a cord that is as homogenous as possible, that is easy to process, and that has a good residual strength after fatigue. A hybrid cord of aramide yarn, such as one with 1670 dtex and a nylon yarn with 1400 dtex has proven to be particularly advantageous in this respect, featuring an outstanding heat shrinking force and residual strength during fatigue and at the same time being cost-effective.

According to an advantageous further development of the invention, the initial and final twist counts are between approximately 320 and approximately 400 T/m (twists per meter). In this manner, a particularly easily processable cord is obtained featuring good flexibility and fatigue resistance.

The plies are used as a belt bandage in the manufacture of vehicle pneumatic tires. The vehicle pneumatic tires usually feature a radial carcass. This is anchored in the bead area by wrapping high-tensile-strength bead cores. A tread rubber is located radially outside and features profile grooves. A belt is located between the tread rubber and the carcass and comprises at least one belt ply with rubberized strength carriers. If necessary, there is arranged between the tread rubber and the belt, a single-ply or multiple-ply belt bandage for the belt made of parallel strength carriers running essentially in the tire circumferential direction. This belt bandage covers at least the belt edges.

A vehicle pneumatic tire with the ply according to the invention as a belt bandage can be produced by way of conventional tire manufacturing processes in that the individual tire components are wound on a tire building drum and the tire is subsequently shaped and vulcanized.

The invention also provides a belt bandage for a vehicle pneumatic tire comprising a ply comprising strength carriers embedded in an unvulcanized rubber mixture. The strength carriers run essentially parallel to one another. Each strength carrier comprising a hybrid cord that includes a first twisted yarn having a high modulus of elasticity of at least approximately 25000 N/mm$^2$ and a second twisted yarn having a low modulus of elasticity which is no greater than approximately 15000 N/mm$^2$, whereby the first and second twisted yarns are final-twisted together. A cord count E in cords per 5 cm ply widths, a force $F_1$ at 2% elongation of each hybrid cord, and a force $F_2$ at 6% elongation of each hybrid cord satisfies the following relationships:

$$F_1 \times E \geq \text{approximately 600 N}$$

$$F_2 \times E > \text{approximately 1500 N.}$$

At least one of the hybrid cords may be symmetrically structured. The hybrid cords may each have an initial twist count that is essentially equal to a maximum deviation of approximately 7%. The hybrid cords may each have a final twist count that is essentially equal to the initial twist count. The initial and final twist counts may be between approximately 320 T/m and approximately 400 T/m. The first twisted yarn may be twisted in a Z direction and the second twisted yarn may be twisted in an S direction. The second twisted yarn may be twisted in a Z direction and the first twisted yarn may be twisted in an S direction.

The cord count E in cords per 5 cm ply width and the force $F_1$ at 2% elongation of the hybrid cord may satisfy the following relationship:

$$\text{approximately 1000 N} < F_1 \times E < \text{approximately 2000 N.}$$

The cord count E in cords per 5 cm ply width and the force $F_2$ at 6% elongation of the hybrid cord may satisfy the following relationship:

approximately 5500 N<$F_2 \times E$<approximately 11000 N.

The cord count E in cords per 5 cm ply width and the force $F_3$ at 1% elongation of the hybrid cord may satisfy the following relationship:

$F_3 \times E$>approximately 250 N.

The cord count E in cords per 5 cm ply width and the force $F_4$ at 4% elongation of the hybrid cord may satisfy the following relationship:

$F_4 \times E$>approximately 3000 N.

The first twisted yarn may be an Aramide yarn with a fineness of ≧approximately 1100 dtex. The aramide yarn may comprise co-poly-paraphenylene/3,4'-oxydiphenylene terephthalamide. The second twisted yarn may be a Nylon yarn with a fineness of ≧approximately 940 dtex.

The invention also provides for a pneumatic tire containing a belt bandage described above.

The invention also provides for a pneumatic tire comprising a ply comprising hybrid cords embedded in an unvulcanized rubber mixture. The hybrid cords are arranged essentially parallel to one another. Each hybrid cord includes a first twisted yarn having a modulus of elasticity of at least approximately 25000 N/mm² and a second twisted yarn having a modulus of elasticity which is no greater than approximately 15000 N/mm². A cord count E in cords per 5 cm ply widths, a force $F_1$ at 2% elongation of each hybrid cord, and the force $F_2$ at 6% elongation of each hybrid cord satisfies the following conditions:

$F_1 \times E$≧approximately 600 N $F_2 \times E$>approximately 1500 N.

Each hybrid cord may have an initial twist count and the initial twist counts may not deviate from one another by more than approximately 7%. Each hybrid cord may have a final twist count that is essentially equal to the initial twist count. The initial and final twist counts may be between approximately 320 T/m and approximately 400 T/m. The first twisted yarn may be twisted in a Z direction and the second twisted yarn is twisted in an S direction. The second twisted yarn may be twisted in a Z direction and the first twisted yarn is twisted in an S direction.

The cord count E in cords per 5 cm ply width and the force $F_1$ at 2% elongation of the hybrid cord may satisfy the following condition:

approximately 1000 N<$F_1 \times E$<approximately 2000 N.

The cord count E in cords per 5 cm ply width and the force $F_2$ at 6% elongation of the hybrid cord may satisfy the following condition:

approximately 5500 N<$F_2 \times E$<approximately 11000 N.

The cord count E in cords per 5 cm ply width and the force $F_3$ at 1% elongation of the hybrid cord may satisfy the following relationship:

$F_3 \times E$>approximately 250 N.

The cord count E in cords per 5 cm ply width and the force $F_4$ at 4% elongation of the hybrid cord may satisfy the following relationship:

$F_4 \times E$>approximately 3000 N.

The first twisted yarn may be an Aramide yarn with a fineness of ≧approximately 1100 dtex. The aramide yarn may comprise co-poly-paraphenylene/3,4'-oxydiphenylene terephthalamide. The second twisted yarn may be a Nylon yarn with a fineness of ≧approximately 940 dtex. The ply may be arranged in a belt bandage.

The invention also provides for a ply for a pneumatic tire comprising hybrid cords embedded in an unvulcanized rubber mixture. The hybrid cords are arranged essentially parallel to one another. Each hybrid cord includes a first twisted yarn having a modulus of elasticity of at least approximately 25000 N/mm² and a second twisted yarn having a modulus of elasticity which is no greater than approximately 15000 N/mm². Each hybrid cord has an initial twist count and a final twist count that is essentially equal to the initial twist count. A cord count E in cords per 5 cm ply widths, a force $F_1$ at 2% elongation of each hybrid cord, and the force $F_2$ at 6% elongation of each hybrid cord satisfies the following conditions:

$F_1 \times E$≧approximately 600 N $F_2 \times E$>approximately 1500 N.

The invention also provides for a method of making a pneumatic tire with the ply of described above wherein the method comprises embedding hybrid cords in an unvulcanized rubber mixture and arranging a ply with the hybrid cords in the pneumatic tire.

The invention also provides for a method of making a tire with the belt bandage described above wherein the method comprises embedding strength carriers in an unvulcanized rubber mixture and arranging the belt bandage in the tire.

The invention also provides for a method of making a pneumatic tire of described above wherein the method comprises embedding hybrid cords in an unvulcanized rubber mixture and arranging a ply with the hybrid cords in the pneumatic tire.

Exemplary embodiments and further advantages of the invention are explained in more detail in connection with the tables.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention.

An aramide yarn on the basis of co-poly-paraphenylene/3,4'-oxydiphenylene terephthalamide with a fineness of 1670 dtex, Z-twisted with 370 T/m initial twisting and a yarn of nylon 6.6 with a fineness of 1400 dtex, S-twisted with 370 T/m initial twisting were twisted with a final twisting of 370 T/m into a hybrid cord (aramide 1670×1+PA6.6 1400×1). This cord featured the residual strengths after fatigue with 50 mio. cycles of compression/elongation 2.5%/2.5% alternating stress shown in Table 1. Cords of nylon and aramide are listed for comparison. It is clear that the hybrid cord exhibits a higher residual strength after fatigue than the aramide cord.

TABLE 1

| Cord construction | Twist count [T/m] | Residual strength after fatigue [%] |
|---|---|---|
| Hybrid [Aramide dtex 1670x1 + Nylon 1400x1] | 370/370 | 100 |
| Nylon dtex 1400x2 | 370/370 | 100 |
| Aramide diex 1670x2 | 370/370 | 60–80 |

The hybrid cords were pretreated with impregnations customary in the rubber industry and guided in the longitudinal direction as cord ply or in the form of individual cords through a calender or an extruder to be covered with a rubber mixture customary for embedding strength carriers under heating.

With the above-mentioned hybrid cord stress/strain data were determined in accordance with ASTM D 885M and they are listed in table 2. Furthermore, the products of force $F_x$, at x% elongation and the cord count E for various cord counts per 5 cm ply width, i.e., for various cord thread densities, are given in the table, whereby all plies are embodied according to the invention.

TABLE 2

| | $F_x$ of the calendered individual cord [N] | $F_x$ × E for calendered plies | | | |
|---|---|---|---|---|---|
| | | E = 45 [N] | E = 40 [N] | E = 35 [N] | E = 30 [N] |
| 1% elongation | 16 | 720 | 640 | 560 | 480 |
| 2% elongation | 34 | 1530 | 1360 | 1190 | 1020 |
| 3% elongation | 56 | 2520 | 2240 | 1960 | 1680 |
| 3.5% elongation | 72 | 3240 | 2880 | 2520 | 1920 |
| 4% elongation | 90 | 4050 | 3600 | 3150 | 2700 |
| 6% elongation | 195 | 8780 | 7810 | 6830 | 5860 |
| 8% elongation | 333 | 14990 | 11320 | 11660 | 9990 |

Analogous data were determined for nylon 6.6 cords with an initial and final twist of 480 T/m in the cord with dtex 940×2 and an initial and final twist of 370 T/m in the cord with dtex 1400×2 and these are listed in Table 3, whereby it is clear that the plies with nylon do not satisfy the conditions $F_1 \times E \geq 600$ N and $F_2 \times E > 1500$ N.

TABLE 3

| | $F_x$ of the calendered individual cord | | $F_x$ × E for calendered plies | |
|---|---|---|---|---|
| | Nylon dtex 940 × 2 [N] | Nylon dtex 1400 × 2 [N] | Nylon dtex 940 × 2 E = 50.5 [N] | Nylon dtex 1400 × 2 E = 45 [N] |
| 1% elongation | 0.7 | 0.9 | 360 | 420 |
| 2% elongation | 1.1 | 1.5 | 560 | 680 |
| 3% elongation | 1.4 | 1.9 | 710 | 860 |
| 3.5% elongation | 1.6 | 2.1 | 780 | 940 |
| 4% elongation | 1.7 | 2.3 | 880 | 1030 |
| 6% elongation | 2.6 | 3.3 | 1330 | 1480 |
| 8% elongation | 3.9 | 4.7 | 1990 | 2100 |

Utilizing a ply with the hybrid cord (aramide 1670×1+ PA6.6 1400×1) with a cord count of 45 cords per 5 cm as a single-ply belt bandage over a two-ply steel belt, tires A with dimension 235/45 R 17 were produced according to conventional production methods. As a comparison, the same tire B was produced with a two-ply-three-ply at the belt edges-belt bandage containing nylon 6.6 with the construction 1400×2 and a cord count E of 45 (cord according to Table 3). The tires were tested for abrasion, high-speed serviceability, flatspotting under load and weight.

The abrasion behavior of the tires was tested in a road test (20000 km total distance) and on test machines, with the result that the tire A with the ply according to the invention as bandage has clear advantages (i.e., reduced abrasion) in uneven and local abrasion (e.g., block breakaways or saw tooth profile) as well as abrasion (e.g., rib lowering) that is homogeneous in the circumferential direction, compared with comparison tire B with a nylon bandage. In particular the abrasion in the center area of the tire was greatly reduced with the tires A. The life expectancies determined from the machines and the road data for the tires are approx. 20% higher for the tire A with the ply according to the invention as bandage.

A comparison of the tires A and B in the high-speed range showed an improved high-speed durability for the tire A, so that the tire in high-speed driving did not fail on the test machine until a speed higher by 10 to 20 km/h compared to tire B. The flatspotting under load is reduced by 10% with tire A compared with tire B and the weight of tire A compared with tire B was reduced by 635 g by the use of a single-ply bandage that, despite being single-ply, brings about an improved high-speed durability in the tire compared with a multi-ply nylon bandage.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A belt bandage for a vehicle pneumatic tire comprising:
   a ply comprising strength carriers embedded in an unvulcanized rubber mixture;
   the strength carriers running essentially parallel to one another; and
   each strength carrier comprising a hybrid cord that includes a first twisted yarn having a high modulus of elasticity of at least approximately 25000 N/mm$^2$ and a second twisted yarn having a low modulus of elasticity which is no greater than approximately 15000 N/mm$^2$, whereby the first and second twisted yarns are final-twisted together,
   wherein each hybrid cord has a final twist count that is essentially equal to an initial twist count of each of the first and second twisted yarns, and
   wherein for a cord count E in cords per 5 cm ply widths, a force $F_1$ at 2% elongation of each hybrid cord, and a force $F_2$ at 6% elongation of each hybrid cord satisfies the following relationships:

$F_1 \times E \geq$ approximately 600 N $F_2 \times E >$ approximately 1500 N.

2. The belt bandage of claim 1, wherein the hybrid cords each have an initial twist count that is essentially equal to a maximum deviation of approximately 7%.

3. The belt bandage of claim 1, wherein the initial and final twist counts are between approximately 320 T/m and approximately 400 T/m.

4. A belt bandage for a vehicle pneumatic tire comprising:
a ply comprising strength carriers embedded in an unvulcanized rubber mixture;
the strength carriers running essentially parallel to one another; and
each strength carrier comprising a hybrid cord that includes a first twisted yarn having a high modulus of elasticity of at least approximately 25000 N/mm² and a second twisted yarn having a low modulus of elasticity which is no greater than approximately 15000 N/mm², whereby the first and second twisted yarns are final-twisted together,
wherein the first twisted yarn is twisted in a Z direction and the second twisted yarn is twisted in an S direction, and
wherein for a cord count E in cords per 5 cm ply widths, a force $F_1$ at 2% elongation of each hybrid cord, and a force $F_2$ at 6% elongation of each hybrid cord satisfies the following relationships:

$F_1 \times E \geq$ approximately 600 N $F_2 \times E >$ approximately 1500 N.

5. A belt bandage for a vehicle pneumatic tire comprising:
a ply comprising strength carriers embedded in an unvulcanized rubber mixture;
the strength carriers running essentially parallel to one another; and
each strength carrier comprising a hybrid cord that includes a first twisted yarn having a high modulus of elasticity of at least approximately 25000 N/mm² and a second twisted yarn having a low modulus of elasticity which is no greater than approximately 15000 N/mm², whereby the first and second twisted yarns are final-twisted together,
wherein the second twisted yarn is twisted in a Z direction and the first twisted yarn is twisted in an S direction, and
wherein for a cord count E in cords per 5 cm ply widths, a force $F_1$ at 2% elongation of each hybrid cord, and a force $F_2$, at 6% elongation of each hybrid cord satisfies the following relationships:

$F_1 \times E \geq$ approximately 600 N $F_2 \times E >$ approximately 1500 N.

6. The belt bandage of claim 1, wherein the cord count E in cords per 5 cm ply width and the force $F_1$ at 2% elongation of the hybrid cord satisfies the following relationship:

approximately 1000 N < $F_1 \times E$ < approximately 2000 N.

7. The belt bandage of claim 1, wherein the cord count E in cords per 5 cm ply width and the force $F_2$ at 6% elongation of the hybrid cord satisfies the following relationship:

approximately 5500 N < $F_2 \times E$ < approximately 11000 N.

8. The belt bandage of claim 1, wherein the cord count E in cords per 5 cm ply width and the force $F_3$ at 1% elongation of the hybrid cord satisfies the following relationship:

$F_3 \times E >$ approximately 250 N.

9. The belt bandage of claim 1, wherein the cord count E in cords per 5 cm ply width and the force $F^4$ at 4% elongation of the hybrid cord satisfies the following relationship:

$F_4 \times E >$ approximately 3000 N.

10. The belt bandage of claim 1, wherein the first twisted yarn is an Aramide yarn with a fineness of ≧approximately 1100 dtex.

11. The belt bandage of claim 10, wherein the aramide yarn comprises co-poly-paraphenylene/3,4'-oxydiphenylene terephthalamide.

12. The belt bandage of claim 1, wherein the second twisted yarn is a Nylon yarn with a fineness of ≧approximately 940 dtex.

13. The vehicle pneumatic tire containing a belt bandage of claim 1.

14. A pneumatic tire comprising:
a ply comprising hybrid cords embedded in an unvulcanized rubber mixture;
the hybrid cords being arranged essentially parallel to one another; and
each hybrid cord including a first twisted yarn having a modulus of elasticity of at least approximately 25000 N/mm² and a second twisted yarn having a modulus of elasticity which is no greater than approximately 15000 N/mm²;
a cord count E in cords per 5 cm ply widths,
wherein each hybrid cord comprises one of:
a final twist count that is essentially equal to an initial twist count of each of the first and second twisted yarns,
the first twisted yarn is twisted in a Z direction and the second twisted yarn is twisted in an S direction, and
the first twisted yarn is twisted in an S direction and the second twisted yarn is twisted in a Z direction, and
whereby a force $F_1$ at 2% elongation of each hybrid cord, and the force $F_2$ at 6% elongation of each hybrid cord satisfy the following conditions:

$F_1 \times E \geq$ approximately 600 N $F_2 \times E >$ approximately 1500 N.

15. The tire of claim 14, wherein the first and second twisted yarns of each hybrid cord has an initial twist count and wherein the initial twist counts do not deviate from one another by more than approximately 7%.

16. The tire of claim 15, wherein each hybrid cord has a final twist count that is essentially equal to the initial twist count.

17. The tire of claim 16, wherein the initial and final twist counts are between approximately 320 T/m and approximately 400 T/m.

18. The tire of claim 14, wherein the first twisted yarn is twisted in a Z direction and the second twisted yarn is twisted in an S direction.

19. The tire of claim 14, wherein the second twisted yarn is twisted in a Z direction and the first twisted yarn is twisted in an S direction.

20. The tire of claim 14, wherein the cord count E in cords per 5 cm ply width and the force $F_1$ at 2% elongation of the hybrid cord satisfies the following condition:

approximately 1000 N < $F_1 \times E$ < approximately 2000 N.

21. The tire of claim 14, wherein the cord count E in cords per 5 cm ply width and the force $F_2$ at 6% elongation of the hybrid cord satisfies the following condition:

approximately 5500 N < $F_2 \times E$ < approximately 11000 N.

22. The tire of claim 14, wherein the cord count E in cords per 5 cm ply width and the force $F_3$ at 1% elongation of the hybrid cord satisfies the following relationship:

$F_3 \times E >$ approximately 250 N.

23. The tire of claim 14, wherein the cord count E in cords per 5 cm ply width and the force $F_4$ at 4% elongation of the hybrid cord satisfies the following relationship:

$F_4 \times E >$ approximately 3000 N.

24. The tire of claim 14, wherein the first twisted yarn is an Aramide yarn with a fineness of $\geq$ approximately 1100 dtex.

25. The tire of claim 24, wherein the aramide yarn comprises co-poly-paraphenylene/3,4'-oxydiphenylene terephthalamide.

26. The tire of claim 14, wherein the second twisted yarn is a Nylon yarn with a fineness of $\geq$ approximately 940 dtex.

27. The tire of claim 14, wherein the ply is arranged in a belt bandage.

28. A ply for a pneumatic tire comprising:
   hybrid cords embedded in an unvulcanized rubber mixture;
   the hybrid cords being arranged essentially parallel to one another;
   each hybrid cord including a first twisted yarn having a modulus of elasticity of at least approximately 25000 N/mm² and a second twisted yarn having a modulus of elasticity which is no greater than approximately 15000 N/mm²;
   the first and second twisted yarns of each hybrid cord having an initial twist count and each hybrid cord having a final twist count that is essentially equal to the initial twist count; and one of:
      the first twisted yarn is twisted in a Z direction and the second twisted yarn is twisted in an S direction, and
      the first twisted yarn is twisted in an S direction and the second twisted yarn is twisted in a Z direction, and
   a cord count E in cords per 5 cm ply widths, a force $F_1$ at 2% elongation of each hybrid cord, and the force $F_2$ at 6% elongation of each hybrid cord satisfying the following conditions:

$F_1 \times E \geq$ approximately 600 N $F_2 \times E >$ approximately 1500 N.

29. A method of making a pneumatic tire with the ply of claim 28, the method comprising:
   embedding hybrid cords in an unvulcanized rubber mixture; and
   arranging a ply with the hybrid cords in the pneumatic tire.

30. A method of making a tire with the belt bandage of claim 1, the method comprising:
   embedding strength carriers in an unvulcanized rubber mixture; and
   arranging the belt bandage in the tire.

31. A method of making a pneumatic tire of claim 14, the method comprising:
   embedding hybrid cords in an unvulcanized rubber mixture; and
   arranging a ply with the hybrid cords in the pneumatic tire.

32. The tire of claim 14, wherein each of the hybrid cords is symmetrically structured such that each hybrid cord has a final twist count that is essentially equal to an initial twist count of each of the first and second twisted yarns with a maximum deviation of approximately 7%, and one of: the first twisted yarn is twisted in a Z direction and the second twisted yarn is twisted in an S direction, and the first twisted yarn is twisted in an S direction and the second twisted yarn is twisted in a Z direction.

33. The ply of claim 28, wherein each of the hybrid cords is symmetrically structured such that each hybrid cord has a final twist count that is essentially equal to an initial twist count of each of the first and second twisted yarns with a maximum deviation of approximately 7%, and one of: the first twisted yarn is twisted in a Z direction and the second twisted yarn is twisted in an S direction, and the first twisted yarn is twisted in an S direction and the second twisted yarn is twisted in a Z direction.

34. The tire of claim 1, wherein each of the hybrid cords is symmetrically structured such that each hybrid cord has a final twist count that is essentially equal to an initial twist count of each of the first and second twisted yarns with a maximum deviation of approximately 7%, and one of: the first twisted yarn is twisted in a Z direction and the second twisted yarn is twisted in an S direction, and the first twisted yarn is twisted in an S direction and the second twisted yarn is twisted in a Z direction.

* * * * *